No. 887,666.  
PATENTED MAY 12, 1908.  
J. F. LESTER.  
ELECTRIC WATER PURIFIER.  
APPLICATION FILED NOV. 28, 1906. RENEWED DEC. 12, 1907.  
2 SHEETS—SHEET 2.
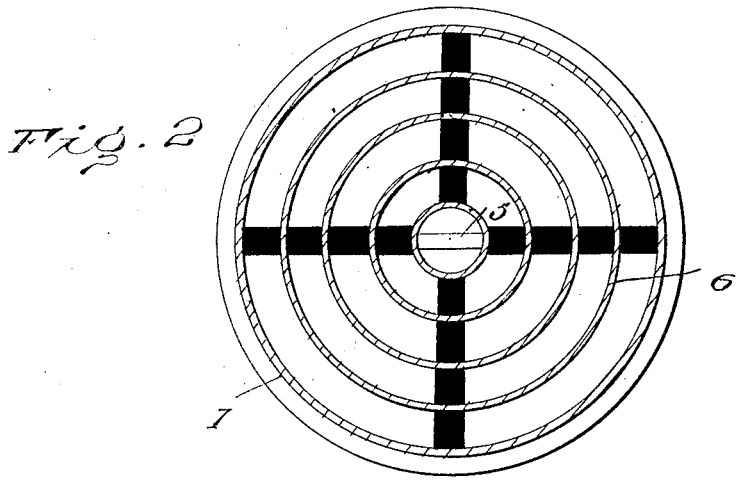
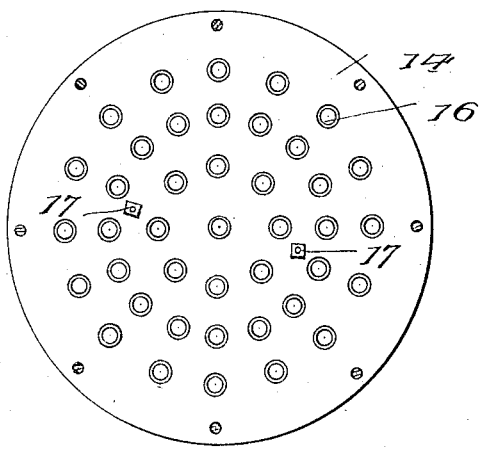
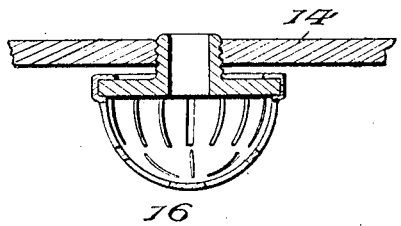
Inventor  
James F. Lester

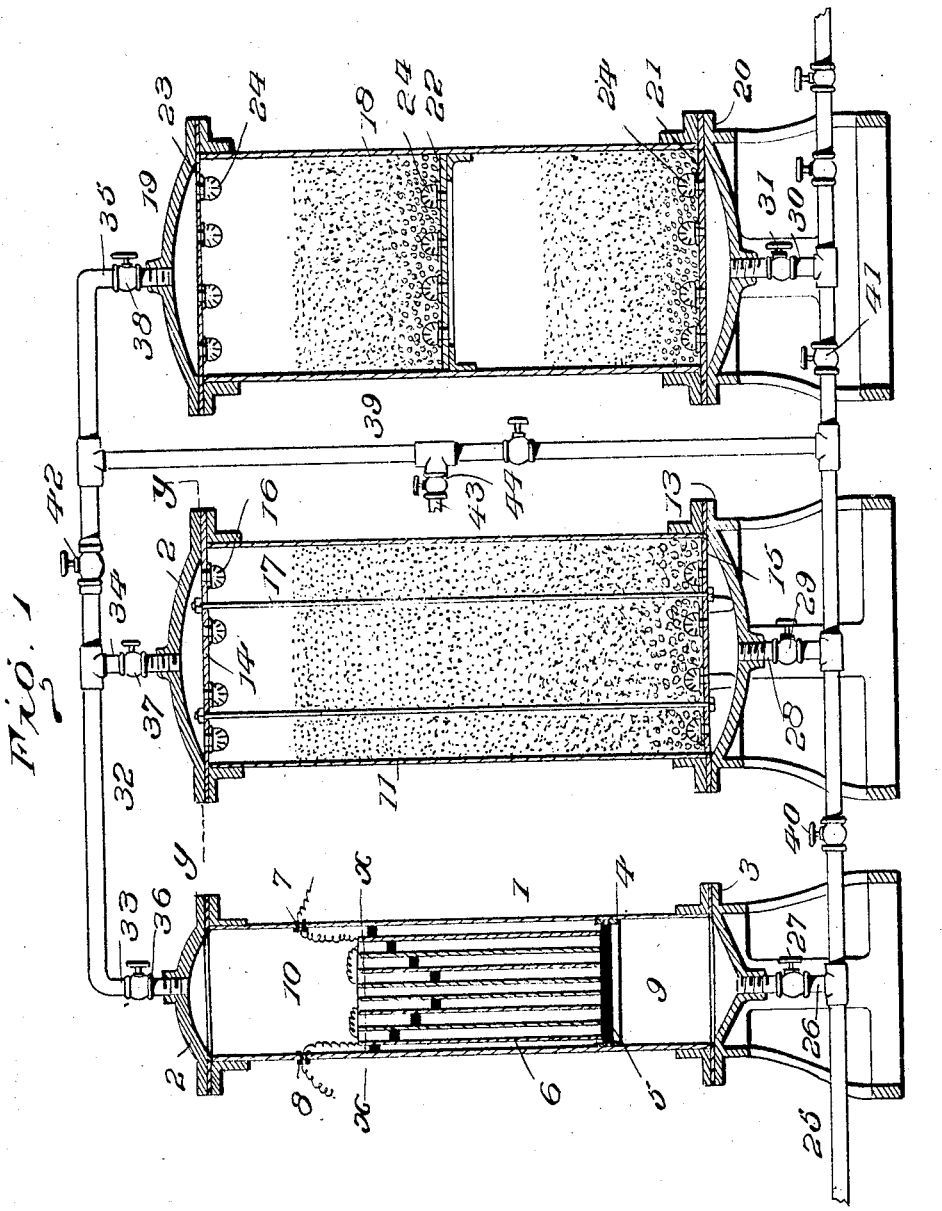

UNITED STATES PATENT OFFICE.

JAMES F. LESTER, OF NEW YORK, N. Y., ASSIGNOR, BY MESNE ASSIGNMENTS, TO ELECTROLYTIC FILTERING AND PURIFYING CO., A CORPORATION OF NEW YORK.

ELECTRIC WATER-PURIFIER.

No. 887,666.　　　　　Specification of Letters Patent.　　　　Patented May 12, 1908.

Application filed November 28, 1906, Serial No. 345,504. Renewed December 12, 1907. Serial No. 406,203.

*To all whom it may concern:*

Be it known that I, JAMES F. LESTER, a citizen of the United States, residing at New York, in the county of New York and State of New York, have invented certain new and useful Improvements in Electric Water-Purifiers, of which the following is a specification.

The invention relates to an improvement in water-purifiers in which the water is initially subjected to an electrolytic action and then filtered successively through a series of mediums.

The main object of the present invention, therefore, is to utilize electrodes of such material as to preclude their deterioration under the action of the current, and hence avoid any objectionable material in the water as a result of the electrolytic action, and at the same time soften the water.
A further object is to subject the water after the electrolysis to a filtering operation by the use of a series of filtering beds, and to so direct the water to these beds as to insure a continual agitation of the filtering material, whereby the water is more thoroughly reached and the filtering operation more effective.

With the above objects in view, the invention consists in certain details of construction which will be described in the following specification, reference being had particularly to the accompanying drawings, in which—

Figure 1 is a vertical section of my improved apparatus. Fig. 2 is a horizontal section on the line *x—x*, Fig. 1. Fig. 3 is a similar view on the line *y—y*, Fig. 1. Fig. 4 is a detail section of one of the spraying nozzles.

Referring particularly to the accompanying drawings, my improved water-purifying apparatus includes an electrolytic chamber, in which the water is initially treated to the action of an electric current, a main filtering chamber, in direct communication with the electrolytic chamber and arranged to receive and filter the initially-treated water, and a secondary filtering chamber, in which the water, filtered in the main chamber, is further subjected to a filtering action.
The electrolytic chamber comprises a tank 1, preferably a cylindrical casing closed at top and bottom by removable top and bottom sections 2, and 3, to permit ready access to the tank for cleansing. An annular flange 4, is secured to the inner surface of the tank, which supports an insulated bar 5.

The electrodes 6, are directly supported by the bar 5, and comprise a series of cylinders of varying diameters and nested to provide a series of concentrically disposed bodies of equal height and equally spaced apart to permit of free passage of the water between any two adjacent cylinders. The series of electrodes are connected in multiple, that is, each alternate cylinder is connected directly with a service conductor as 7, and the remaining electrodes in circuit with a conductor 8.

The electrodes may be differently shaped if desired, for instance they may be square, hexagon or other similar shape.

I aim to entirely eliminate the deteriorating effect of the current and liberated gases, and in so doing soften the water, and to this end the electrodes of my apparatus are to be of pure nickel.

The electrodes are arranged within the electrolytic chamber to have an uninterrupted space 9, and 10, below and above them in order to insure a most effective action of the current, as will presently appear.

The main filtering chamber comprises a cylindrical vessel or tank 11, also preferably a cylindrical casing closed at the ends by removable sections 12, and 13, both sections being of segmental form as shown. The upper end of the casing proper is closed within the bottom 13, by a similar perforate plate 15. Between the respective plates 14, and 15, within the casing is arranged a mass of sand or quartz, or similar filtering medium, of comparatively fine material. The plates 14, and 15, are each formed with a comparatively large number of perforations and each perforation is provided with a nozzle 16. The nozzles are short bulb-like bodies, the discharge ends being slitted in several places to provide for delivering the water in a series of fine sprays. The nozzles in the respective plates project from said plates toward the filtering medium, hence the latter is subjected to the spraying action of the water, with the effect to keep said medium constantly agitated with the best filtering results.

The plates 14, and 15, may, if desired be connected by a series of rods 17, extending longitudinally of the casing, to more effectively support the lower plate against the weight of the filtering agent.

The secondary chamber is practically a duplicate of the main chamber, including a cylindrical casing 18, closed by segmental end plates 19, and 20. The casing is divided into a plurality of filtering chambers by a series of transverse perforate plates 21, 22, and 23, each provided with a series of nozzles 24, as in the main chamber. The two filtering chambers are filled respectively with coarse quartz or sand and charcoal, it being understood that the plates 21, and 23, are located at the respective ends of the closing and the plate 22, centrally thereof.

The purifying apparatus described is fed by a service pipe 25, in communication with the electrolytic chamber through a branch pipe 26, having a valve 27, with the main filtering chamber through a branch pipe 28, valved at 29, and with the secondary chamber through a branch pipe 30, valved at 31, all of said branch pipes entering the respective chambers through the lower end.

The upper ends of the respective chambers are in communication with each other through a main 32, connected with said chambers through branches 33, 34, and 35, each valved at 36, 37, and 38, the main 32, being also in direct communication with the service pipe through a pipe connection 39, arranged between the connections of the two filtering chambers. The service is valved at 40, and 41, between the branches to the electrolytic chamber and the main filtering chamber and between the connection pipe 39, and the secondary chamber branch, and the main 32, is valved at 42, between the main chamber branch and the connection of the pipe 39. The pipe 39, is also in communication with a waste pipe 43, and is valved below the same at 44.

The above described means of communication provide for the uninterrupted flow of the material through the respective chambers, as with the valves 40, and 41, closed the water will travel successively through the respective chambers from top to bottom. The connections also provide for cleansing either of the chambers, as for example by closing the valves 27, and 36, opening valves 40, and closing valve 44, the water from the service pipe will be forced upward through the main filtering chamber and out to waste 43. As this flow is the reverse to the filtering flow the filtering agent is cleansed and the accumulations carried off through the waste. By closing the valve in the service pipe beyond the apparatus, and also closing valves 27, 29, 42, and 44, and opening valves 40, and 41, the secondary chamber may be flushed and the refuse sent through the waste pipe.

The purifying apparatus is thus constructed for cleaning or flushing by the simple manipulation of valve connections, thereby maintaining an absolutely clear and purified product.

What I claim is:

1. A water purifying apparatus including an electrolytic chamber and a filtering chamber, said electrolytic chamber having a series of nickel electrodes connected in multiple, each of said nickel electrodes being in direct contact with the water being treated.

2. A water purifying apparatus including an electrolytic chamber and a filtering chamber, and a series of nickel electrodes arranged in the electrolytic chamber, said electrodes being in direct contact with the water being treated and arranged in a nested spaced series and electrically connected.

3. A water purifying apparatus including an electrolytic chamber, said electrolytic chamber having a series of nickel electrodes which are in direct contact with the water being treated, and means for electrically connecting the electrodes.

4. A water purifying apparatus having a series of continuous nickel electrodes which are in direct contact with the water being treated, and means for electrically connecting the electrodes.

5. A water purifying apparatus comprising an electrolytic chamber having a series of nickel electrodes which are in direct contact with the water being treated and spaced from the top and bottom of said electrolytic chamber to form chambers, a feed water pipe for introducing water into the lower chamber and below the nickel electrodes, and an exit pipe communicating with the upper chamber to carry off the water having passed between the electrodes.

In testimony whereof I have signed my name to this specification in the presence of two subscribing witnesses.

JAMES F. LESTER.

Witnesses:
W. N. WOODSON,
JNO. IMRIE.